ns, coating or plastic

UNITED STATES PATENT OFFICE 2,336,723

CONCRETE, CEMENT, AND THE LIKE, AND THE PROCESS OF MAKING THE SAME

John V. Drummond, Washington, D. C.

No Drawing. Application March 11, 1941,
Serial No. 382,676

8 Claims. (Cl. 106—76)

My invention relates to an admixture for concrete, cement, mortar and the like, and the admixture is of such a nature that sea or ocean water can be utilized as the wetting agent for mixing the concrete mix and the admixture together.

When the admixture is added to a concrete mix, sea or ocean water can be employed as a vehicle or wetting agent for mixing the concrete mix and the admixture together because the admixture neutralizes or stabilizes the salts groups of the sea water.

Sea or ocean water has not heretofore been successfully used in making concrete because of the excessive amounts of the salts groups therein.

The chemical reactions of the admixture in concrete mixes and the like, where more or less pure water is used as the vehicle or wetting agent for mixing, are set forth in my pending application. Ser. No. 305,550 filed November 21, 1939.

The admixture consists of a group of compounds of inorganic, active materials which when integrally mixed in concrete mixes combines with the excess water remaining after hydration of the cement to form a hard insoluble substance which decreases the permeability and seals the voids of the concrete thus making the concrete impervious to capillary water.

The admixture in solution when added to a concrete mix combines with the free lime and calcium of the cement to neutralize the action of the tri-calcium group of salts which are present during hydration. This action stabilizes the salts group so as to render the concrete resistant to acids, alkalies, oils, greases, etc.

It is also an object of the invention to produce a composition of matter which when admixed with concrete, mortar or the like, will chemically react with the cement of the concrete and the like to produce concrete the voids of which have been sealed to a maximum and as a result the concrete has been made waterproof.

It is a further object of this invention to provide a novel composition of matter adapted to be mixed with concrete and wherein the strength and plastic workability of the concrete is increased without the change of the water ratios.

It is a further object of this invention to compound a composition of matter which when admixed with concrete, will produce a concrete which better resists the weather cycles such as high and low temperatures, freezing, thawing, and the like than any of the prior concretes.

The admixture comprises sodium silicate, calcium chloride, potassium alum (potassium aluminum sulfate), and diatomaceous earth. All of these elements are ground to a fine powder and mixed with Portland cement or its equivalent when the cement is to be added to a concrete mixture.

The critical percentages of my composition or admixture by weight to the amount of cement is as follows:

|  | Per cent |
|---|---|
| Sodium silicate | 1¼ |
| Calcium chloride | ½ |
| Potassium alum | ½ |
| Diatomaceous earth | 1¼ |

When aluminum hydroxide is added to the composition or admixture, the percentages by weight to the amount of cement is as follows:

|  | Per cent |
|---|---|
| Sodium silicate | 1¼ |
| Calcium chloride | ½ |
| Potassium alum | ½ |
| Diatomaceous earth | 1¼ |
| Aluminum hydroxide | ½ |

It is necessary to use three and one-half per cent (3½%) of the admixture by weight to the amount of cement used in such mixtures of concrete as the 1-2-4; 1-1-2; 1-3-5, or other similar mixes.

It has been found possible to obtain very good results with the composition by using a range of one per cent (1%) to three per cent (3%) of sodium silicate; a range of one-fourth per cent (¼%) to one-half per cent (½%) of calcium chloride; a range of one-fourth per cent (¼%) to one per cent (1%) of potassium alum; a range of one-half per cent (½%) to three per cent (3%) of diatomaceous earth; and a range of one-fourth per cent (¼%) to one per cent (1%) of aluminum hydroxide.

Sodium silicate, calcium chloride, potassium alum (potassium aluminum sulfate) and diatomaceous earth are the ingredients which give the best results in an admixture which is to be added to a concrete mix.

It may be found at times that the concrete does not require the aluminum hydroxide and it can be eliminated at such times from the composition of matter. It has also been found that bauxite may be used instead of aluminum hydroxide and concrete is produced which can meet certain needs. Instead of diatomaceous earth it is possible to use aluminum silicate (kaolin) or other earth silicates and obtain very good results in a concrete.

In the group of compounds which are employed by me in the novel composition of matter which is adapted to be added to a concrete mix, the sodium silicate, calcium chloride, diatomaceous earth, and potassium alum in solution chemically reacts with the cement of the concrete mix and this reaction between the composition of matter and the cement of the concrete mix enlarges or increases the crystalline growth of the cement, and the crystals of the cement being more firmly interlocked or bonded together, a greater tensile and compressive strength is added to the concrete. The composition of matter after reacting with the cement of the concrete mix and having increased the crystalline growth of the cement it will seal the voids of the cement. The expansive action or growth of the crystals of the cement takes place after initial hydration of the cement. The calcium chloride in the composition accelerates the setting of the cement. The diatomaceous earth in the composition and in combination with the concrete mix is an emulsifying agent. That is, the diatomaceous earth increases the workability of the concrete mix and insures a homogeneous mass, wherein all of the elements are distributed homogeneously throughout the concrete. The aluminum hydroxide is an agent to further increase the sealing of the porosity of the cement and the mechanical voids of the concrete. Sea or ocean water can be used as the wetting agent and the compounds of the admixture will have the same reactions as when more or less pure water is used as the wetting agent.

When sea or ocean water, due to the excessive amounts of the salts groups in the same, especially sodium chloride and magnesium sulphate, has been used in making concrete, mortar or the like, the concrete did not obtain very great strength or bond, and as a result the concrete was "sugary" and broke up. Now with the admixture added to the concrete mix, when sea water is employed, the admixture stabilizes or neutralizes the salts groups in the sea water and the resulting concrete has a greater tensile and compressive strength than concretes which use sea water without the admixture having been added thereto.

There are concrete constructions, where it is almost impossible or too expensive to obtain more or less pure water, such as sea walls, docks and the like, which are constructed near the ocean. The admixture being added to the concrete mix, sea water can be utilized without having any deleterious effect on the concrete.

The use of the admixture consisting of sodium silicate, calcium chloride, potassium alum, and diatomaceous earth with concrete mixes wherein sea water is the wetting agent, the resulting concrete has a greater bond, greater tensile and compressive strength, is more acid and water proof than concretes which employ sea water without the addition of the admixture to the concrete mix. The range of the compounds of the admixture when added to a concrete mix which employs sea or ocean water as the wetting agent, results in different kinds of concrete, which are required for the varied scope of concretes used in constructions.

What I claim is:

1. The method of making a cementitious composition which comprises adding to a concrete mix including Portland cement, a mixture of 1¼% by weight of sodium silicate to the weight of the cement, ½% of calcium chloride by weight to the weight of the cement, ½% by weight of potassium alum to the weight of the cement, 1¼% by weight of diatomaceous earth to the weight of the cement, and the requisite sea water.

2. The method of making a cementitious composition which comprises adding to a concrete mix including Portland cement, a range of 1% to 3% by weight of sodium silicate to the weight of the cement used, a range of ¼% to ½% by weight of calcium chloride to the weight of the cement, a range of ¼% to 1% by weight of potassium alum to the weight of the cement, a range of ½% to 3% by weight of diatomaceous earth to the weight of the cement, and the requisite sea water.

3. A cementitious composition comprising a concrete mix including Portland cement, 1¼% by weight of sodium silicate to the weight of the cement, ½% of calcium chloride by weight to the weight of the cement, ½% by weight of potassium alum to the weight of cement, 1¼% by weight of diatomaceous earth to the weight of cement, and the requisite sea water.

4. A cementitious composition comprising a concrete mix including Portland cement, a range of 1 to 3% by weight of sodium silicate to the weight of cement used, a range of ¼ to ½% by weight of calcium chloride to the weight of the cement, a range of ¼ to 1% by weight of potassium alum to the weight of cement, a range of ½ to 3% by weight of diatomaceous earth to the weight of cement, and the requisite sea water.

5. A cementitious composition comprising a concrete mix including Portland cement, 1¼% by weight of sodium silicate to the weight of the cement, ½% of calcium chloride by weight to the weight of the cement, ½% by weight of potassium alum to the weight of the cement, 1¼% by weight of diatomaceous earth to the weight of the cement, ½% by weight of aluminum hydroxide to the weight of the cement, and the requisite sea water.

6. A cementitious composition comprising a concrete mix including Portland cement, a range of 1% to 3% by weight of sodium silicate to the weight of the cement, a range of ¼% to ½% by weight of calcium chloride to the weight of the cement, a range of ¼% to 1% by weight of potassium alum to the weight of the cement, a range of ½% to 3% by weight of diatomaceous earth to the weight of the cement, a range of ¼% to 1% of aluminum hydroxide, and the requisite sea water.

7. A cementitious composition comprising a concrete mix including Portland cement, 1¼% by weight of sodium silicate to the weight of the cement, ½% of calcium chloride by weight to the weight of the cement, ½% by weight of potassium alum to the weight of the cement, 1¼% by weight of diatomaceous earth to the weight of the cement, ½% by weight of bauxite to the weight of the cement, and the requisite sea water.

8. A cementitious composition comprising a concrete mix including Portland cement, a range of 1% to 3% by weight of sodium silicate to the weight of the cement, a range of ¼% to ½% by weight of calcium chloride to the weight of the cement, a range of ¼% to 1% by weight of potassium alum to the weight of the cement, a range of ½% to 3% by weight of diatomaceous earth to the weight of the cement, a range of ¼% to 1% of bauxite by weight to the weight of the cement, and the requisite sea water.

JOHN V. DRUMMOND.